(12) United States Patent
Brown

(10) Patent No.: US 9,449,404 B2
(45) Date of Patent: Sep. 20, 2016

(54) ITERATIVE IMAGE RECONSTRUCTION WITH REGULARIZATION

(71) Applicant: KONINKLIJKE PHILIPS N.V., Eindhoven (NL)

(72) Inventor: Kevin Martin Brown, Chardon, OH (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 31 days.

(21) Appl. No.: 14/385,504

(22) PCT Filed: Mar. 22, 2013

(86) PCT No.: PCT/IB2013/052298
§ 371 (c)(1),
(2) Date: Sep. 16, 2014

(87) PCT Pub. No.: WO2013/144804
PCT Pub. Date: Oct. 3, 2013

(65) Prior Publication Data
US 2015/0049930 A1    Feb. 19, 2015

Related U.S. Application Data

(60) Provisional application No. 61/617,094, filed on Mar. 29, 2012.

(51) Int. Cl.
*G06K 9/00* (2006.01)
*G06T 11/00* (2006.01)

(52) U.S. Cl.
CPC ............ *G06T 11/005* (2013.01); *G06T 11/006* (2013.01); *G06T 2211/424* (2013.01)

(58) Field of Classification Search
CPC .. G06T 11/006; G06T 11/008; G06T 11/003; G06T 11/005; G06T 2211/424; G06T 2211/428; G06T 5/002; A61B 6/032; A61B 6/027; A61B 6/4085; A61B 6/4014; A61B 6/4441
USPC .......................................................... 382/131
See application file for complete search history.

(56) References Cited

U.S. PATENT DOCUMENTS 7,596,204 B2    9/2009  Ziegler et al.
8,111,893 B2    2/2012  Chen et al.
9,159,122 B2 *  10/2015 Zabic et al.
(Continued)

FOREIGN PATENT DOCUMENTS

WO    2011036624 A1    3/2011

OTHER PUBLICATIONS

Erdogan, H., et al.; Monotonic Algorithms for Transmission Tomography; 1999; IEEE Trans. on Medical Imaging; 18 (9)801-814.
He, L, et al.; Study on Method of CT Image Reconstruction Based on adaptive Regularised MAP; 2011; Computer Engineering and Applications; 47(28)198-200.
Koehler, T., et al.; Noise Properties of Maximum Likelihood Reconstruction with Edge-Preserving Regularization in Transmission Tomography; 2009; Fully 3D; pp. 263-266.
(Continued)

*Primary Examiner* — Ali Bayat

(57) ABSTRACT

A method includes scaling a regularization term of an update algorithm of an iterative reconstruction algorithm with regularization with a scaling value. The scaling value is variable in at least one dimension, thereby varying the regularization of the iterative reconstruction in the least one dimension. The method further includes iteratively reconstructing an image based at least on the update algorithm, the varying scaled regularization term, and projection data.

19 Claims, 3 Drawing Sheets

(56) References Cited

U.S. PATENT DOCUMENTS

Figure 1:
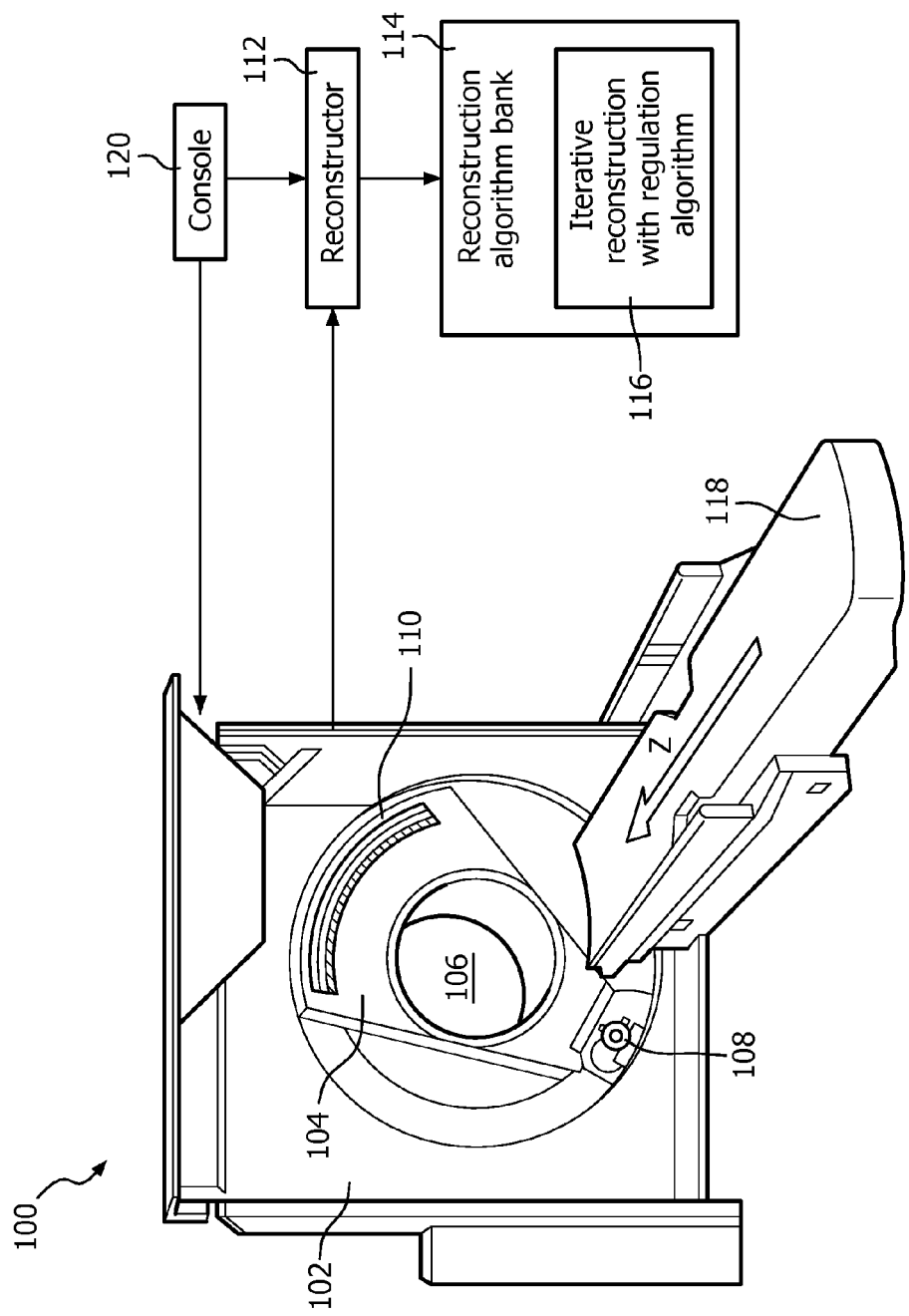

| | | |
|---|---|---|
| 2006/0104408 A1* | 5/2006 | Thibault et al. .................. 378/4 |
| 2006/0215891 A1 | 9/2006 | Fessler et al. |
| 2010/0246917 A1* | 9/2010 | Bruder et al. ................ 382/131 |
| 2011/0075911 A1 | 3/2011 | Xing et al. |
| 2011/0293159 A1 | 12/2011 | Bruder et al. |
| 2013/0101192 A1* | 4/2013 | Nakanishi et al. ........... 382/131 |
| 2013/0129178 A1* | 5/2013 | Wieczorek ................... 382/131 |

OTHER PUBLICATIONS

Shi, H. R., et al.; Quadratic regularization design for 2-D CT; 2009; IEEE Trans. Med. Imaging; 28(5)645-656.

Thibault, J-B., et al.; A three-dimensional statistical approach to improved image quality for multislice helical CT; 2007; Med. Phys.; 34(11)4526-4545.

Yu, Z., et al.; Fast Model-Based X-Ray CT Reconstruction Using Spatially Nonhomogeneous ICD Optimization; 2011; IEEE Trans. on Image Processing; 20(1)161-175.

\* cited by examiner

ITERATIVE IMAGE RECONSTRUCTION WITH REGULARIZATION

CROSS REFERENCE TO RELATED APPLICATIONS

This application is a national filing of PCT application Ser. No. PCT/IB2013/052298, filed Mar. 22, 2013, published as WO 2013/144804 A1 on Oct. 3, 2013, which claims the benefit of U.S. provisional application Ser. No. 61/617,094 filed Mar. 29, 2012, which is incorporated herein by reference.

The following generally relates to iterative image reconstruction with regularization and finds particular application to computed tomography (CT). The following is also amenable to other imaging modalities such as hybrid CT/PET (positron emission tomography), hybrid CT/MR (magnetic resonance), digital x-ray, and/or other imaging modalities.

A CT scanner includes an x-ray tube mounted on a rotatable gantry that rotates around an examination region about a z-axis. A detector array subtends an angular arc opposite the examination region from the x-ray tube. The x-ray tube emits radiation that traverses the examination region. The detector array detects radiation that traverses the examination region and generates projection data indicative thereof. A reconstructor processes the projection data using an iterative or non-iterative reconstruction algorithm which generates an image indicative of the examination region.

Iterative image reconstruction algorithms with regularization have been based on a cost function, which includes a data comparison term and an image noise penalty term. A general formulation of such a cost function is: $\Psi(x) = -L(Ax|y) + \beta \cdot R(x)$, where $\Psi(x)$ represents the cost function, $L(Ax|y)$ represents a likelihood term that compares a forward projected image (Ax, where A is a forward projection operator and x is the image) to measured data (y), R(x) represents a roughness penalty term that penalizes noise (or "roughness") in the reconstructed image (x), and $\beta$ represents a regularization term that controls a strength of the regularization. Without the penalty term, the algorithm would converge to a very noisy image to match the noise present in the data.

Generally, the regularization term $\beta$ is a free parameter and the value thereof is manually determined. The value of $\beta$ can be chosen to allow more or less noise in the final reconstructed image. Unfortunately, the value of $\beta$ tends to be dataset dependent and, thus, should be determined for each patient in order to achieve a consistent noise level for different sized patients and dose levels. That is, if the same value of $\beta$ is used across datasets acquired for different sized patients, of different sized anatomies, and/or with different tube currents, consistent image quality across the resulting iteratively reconstructed images will likely not be achieved.

Aspects described herein address the above-referenced problems and others.

In one aspect, a method includes scaling a regularization term of an update algorithm of an iterative reconstruction algorithm with regularization with a scaling value. The scaling value is variable in at least one dimension, thereby varying the regularization of the iterative reconstruction in the least one dimension. The method further includes iteratively reconstructing an image based at least on the update algorithm, the varying scaled regularization term, and projection data.

In another aspect, a reconstructor includes a scaling factor algorithm bank with at least one scaling factor algorithm and a scaling factor generator that generates a regularization term scaling factor based on the at least one scaling factor algorithm. An update algorithm bank includes at least one iterative reconstruction update algorithm employing a regularization term. A reconstructor processes projection data of a scan and reconstructs an image based on the at least one iterative reconstruction algorithm and the regularization term scaling factor, wherein the scaling factor varies the regularization term of the iterative reconstruction algorithm in at least one dimension.

In another aspect, a computer readable storage medium is encoded with computer readable instructions, which, when executed by a processer, causes the processor to: reconstruct projection data thereby generating an image using an iterative reconstruction algorithm with regularization in which a regularization term of an update algorithm of the iterative reconstruction algorithm varies in at least one dimension based on a number of detected photons in the projection data.

In another aspect, a method includes scaling a regularization term of an update algorithm of an iterative reconstruction algorithm with regularization such that scaling of the regularization in regions of the image where a total or average number of detected photons is higher counteracts a stronger update value of the update algorithm.

The invention may take form in various components and arrangements of components, and in various steps and arrangements of steps. The drawings are only for purposes of illustrating the preferred embodiments and are not to be construed as limiting the invention.

FIG. 1 schematically illustrates an example imaging system including a reconstructor that employs an iterative reconstruction algorithm with varying regularization to reconstruct images.

Figure 2:
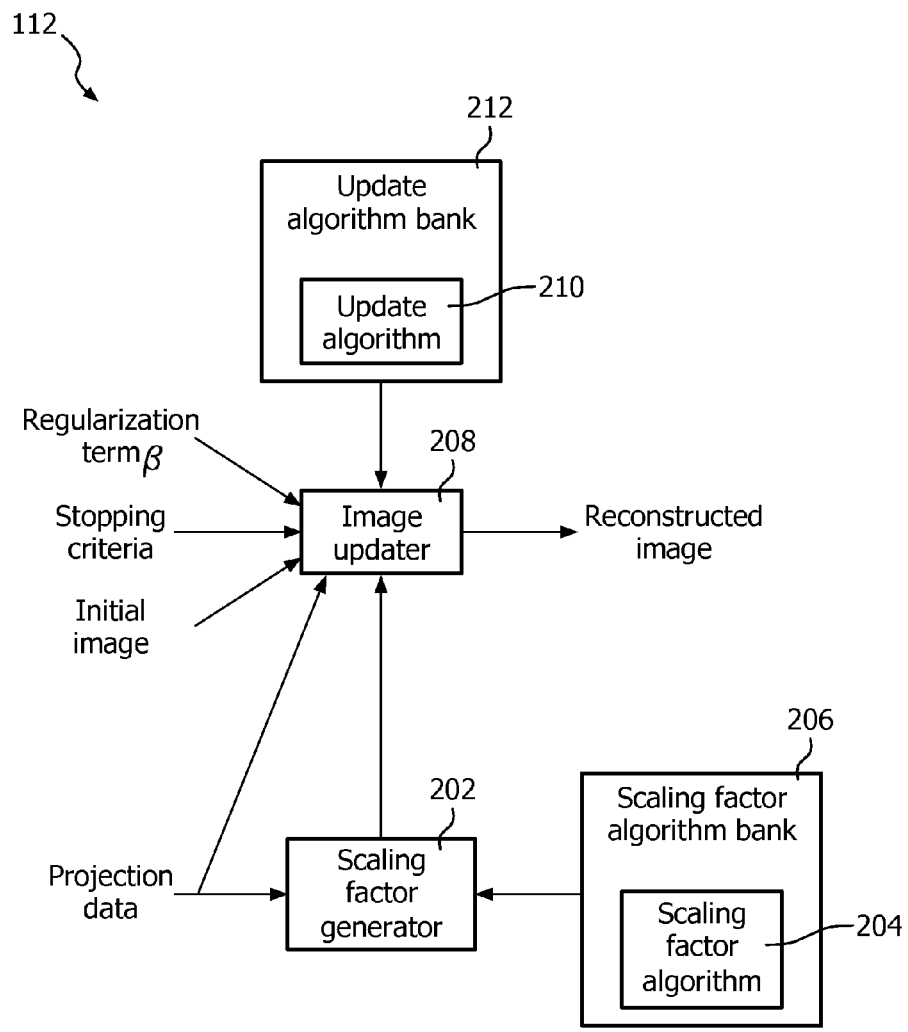

FIG. 2 schematically illustrates an example reconstructor that reconstructs images using an iterative reconstruction algorithm with varying regularization.

Figure 3:
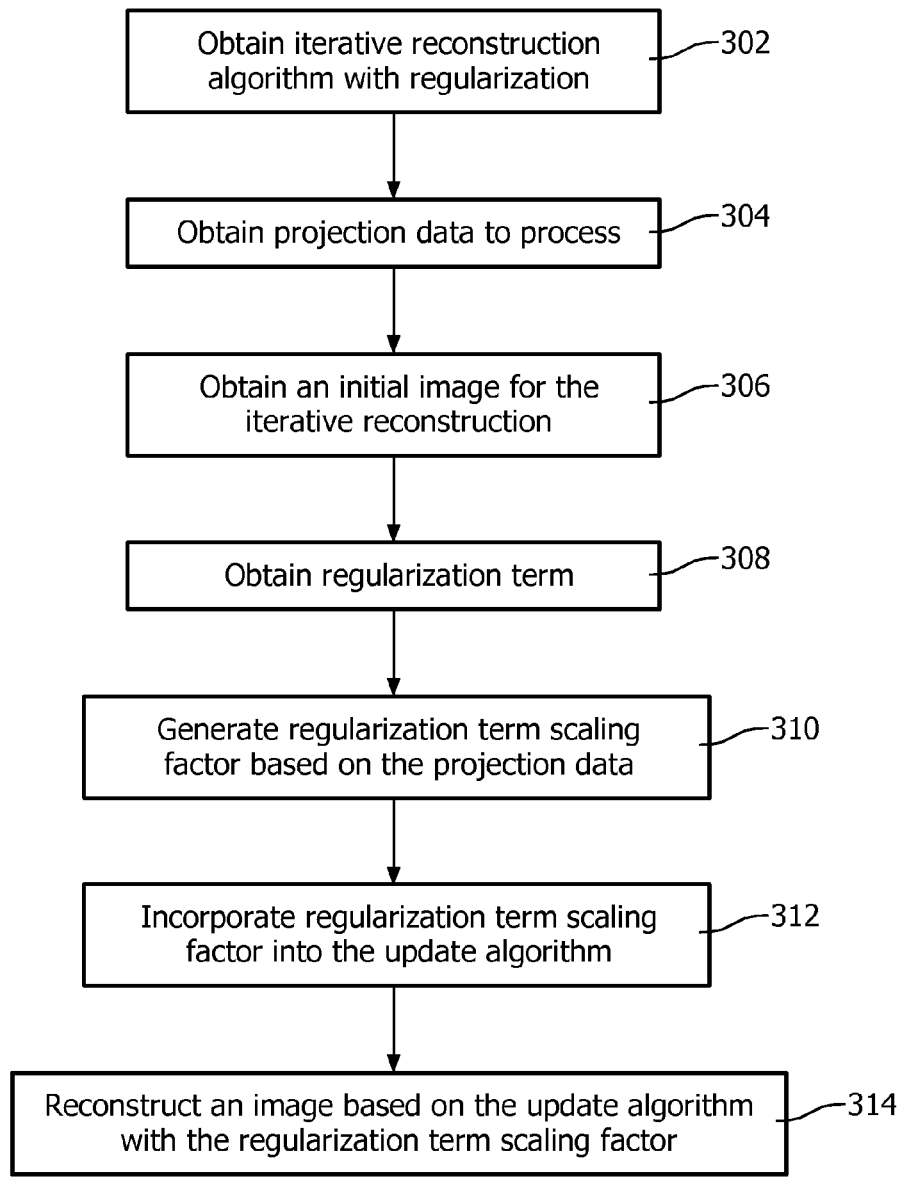

FIG. 3 illustrates an example method of reconstructing an image using an iterative reconstruction algorithm with varying regularization.

The following generally relates to iterative image reconstruction with regularization. As described in greater detail below, with the approach described herein, the regularization term $\beta$ is scaled with a value that varies as a function the backprojection of the number of photons of the projection data being reconstructed. As such, the scaled regularization takes into account patient size, anatomy size, and/or tube current, which allows for reconstructing images with consistent image quality independent of patient size, anatomy size, and/or tube current.

FIG. 1 illustrates an example imaging system 100, such as a computed tomography (CT) scanner.

The imaging system 100 includes a stationary gantry 102 and a rotating gantry 104, which is rotatably supported by the stationary gantry 102 and rotates around an examination region 106 about a z-axis.

A radiation source 108, such as an x-ray tube, is rotatably supported by the rotating gantry 104 and rotates therewith, and emits radiation that traverses the examination region 106.

A one or two dimensional radiation sensitive detector array 110 subtends an angular arc opposite the radiation source 108 across the examination region 106. The detector array 110 detects radiation traversing the examination region 106 and generates projection data indicative thereof.

A reconstructor 112 processes the projection data and reconstructs volumetric image data indicative thereof. In this example, the reconstructor 112 processes the projection data using one or more reconstruction algorithms from a reconstruction algorithm bank 114 such as an iterative reconstruction with regularization algorithm 116. As described in greater detail below, in one instance, the reconstructor 112 determines a scaling factor (s) for the regularization term (β) of the iterative reconstruction algorithm 116 and scales the regularization term with the scaling factor during iterative reconstruction, which varies the regularization in least one dimension (e.g., one, two, three, etc. dimensions) based on the projection data.

As a result, the regularization is specific to the patient and/or scan parameter, takes into account patient size, anatomy size, and/or tube current, and provides consistent image quality (e.g., with respect to image noise) across patients regardless of patient size, anatomy size, and/or tube current. It is to be appreciated that the scaling factor used for a given scan can be selectable from a plurality of predetermined scaling factors. For example, in one instance, a operator may be able to select between low, medium or high scaling, depending on a regularization level of interest, which may be a function of information such as an operator preference, a size of patient, the scan protocol utilized, an initial scout scan, and/or other information.

A subject support 118, such as a couch, supports an object or subject such as a human or animal subject in the examination region 106.

A general-purpose computing system or computer serves as an operator console 120. The console 120 includes a human readable output device such as a monitor and an input device such as a keyboard, mouse, etc. Software resident on the console 120 allows the operator to interact with and/or operate the scanner 100 via a graphical user interface (GUI) or otherwise. For example, the console 120 allows the operator to identify a reconstruction algorithm of interest, such as the iterative reconstruction with regularization algorithm 116 and/or other algorithm, select a regularization scaling factor from a plurality of available scaling factors, etc.

It is to be appreciated that the reconstructor 112 can be implemented via one or more processor (a central processing unit (CPU), a microprocessor (µ-CPU), and the like) executing one or more computer executable instructions embedded or encoded on computer readable storage medium such as physical memory or other non-transitory medium. Additionally or alternatively, at least one of the computer executable instructions can be carried by a carrier wave, signal, or other transitory medium.

Furthermore, the reconstructor 112 can be part of the console 120, a local computing device, and/or a remote (remote from the system 100, e.g., located in a different room, facility, state, etc.) computing device.

FIG. 2 illustrates an example of the reconstructor 112.

A scaling factor generator 202 receives the projection data from the detector array 110 (FIG. 1) and generates a scaling factor s based on the received projection data using a scaling factor algorithm 204 of a scaling factor algorithm bank 206. Suitable scaling factor algorithms include scaling factor algorithms that when combined with the regularization term β vary the regularization term β such that the regularization varies in at least one dimension.

A non-limiting example of such a scaling factor algorithm is shown in EQUATION 1:

$$s = (BP[y_i])^n, \quad \text{EQUATION 1:}$$

where $y_i$ represents the projection data, BP represents the backprojection operator, and n represents a positive real number. Generally, $y_i$ is a number proportional to the detected number of photons (or the signal intensity) for each data point in each integration period within the current scan, and i is an index over each data point in the sinogram. Another non-limiting example would be a polynomial function, $s = a*(BP[yi])^k + b*(BP[yi])^{k-1} + \ldots g$, where k is a positive integer. Other scaling factor algorithms are also contemplated herein.

An image updater 208 iteratively reconstructs an image based on the scaling factor s, the projection data, an initial image (e.g., all zeros, an initial backprojected image, a de-noised image, etc.), stopping criteria (e.g., a time limit, an difference value between consecutive reconstructions, etc.), a predetermined value for the regularization term β (e.g., default, user defined, determined empirically, etc.), and an image update algorithm 210 of an image update algorithm bank 212.

A non-limiting example of a suitable image update algorithm 210 is shown in EQUATION 2:

$$x_j^{n+1} = x_j^n + \frac{M \cdot BP[b_i e^{-l_i} - y_i] + \beta \sum_k w_k \psi(x_j^n - x_k^n)}{BP[y_i a_i] + \beta \sum_k w_k \dot\psi(x_j^n - x_k^n)}, \quad \text{EQUATION 2}$$

where $x_i^{n+1}$ represents a current image, $x_j^n$ represents a previous image, M represents a number of subsets of projections, BP represents the backprojection operator, $b_i e^{-l_i}$ represents a forward projected image, $y_i$ represents the projection data, $\alpha_i$ represents the sum of the weights of the forward projection operator A along the line integral i, $\psi$ represents the penalty function (e.g., the Huber or other penalty), $(x_j^n - x_k^n)$ represents the image voxel gradients (or the difference between voxels), $w_k$ represents a weighting between voxels (e.g., a center to center or other distance, etc.), k represents neighboring pixels (all or a subset thereof), and β represents the regularization term.

The image updater 208 scales the regularization term β in EQUATION 2 with EQUATION 1 as shown in EQUATION 3:

$$x_j^{n+1} = x_j^n + \frac{M \cdot BP[b_i e^{-l_i} - y_i] + (\beta(BP[y_i])^n) \sum_k w_k \psi(x_j^n - x_k^n)}{BP[y_i a_i] + (\beta^n \sqrt{BP[y_i]}) \sum_k w_k \dot\psi(x_j^n - x_k^n)}, \quad \text{EQUATION 3}$$

which means that in regions of the image where the total (or average) number of detected photons is high, the regularization strength will be stronger, which counteracts the stronger update value given in the left side of the numerator of EQUATION 3, and in regions of the image where the number of detected photons is low, the regularization strength will be reduced, again balancing the changes from the reduced update in those regions.

The update algorithm of EQUATION 2 is based on a Poison noise penalty. For a Gaussian noise penalty, a non-limiting instance of a suitable image update algorithm 210 is shown in EQUATION 4:

$$x_j^{n+1} = x_j^n + \frac{M \cdot BP[y_i(f_i - l_i)] + \beta \sum_k w_k \psi(x_j^n - x_k^n)}{BP[y_i a_i] + \beta \sum_k w_k \dot\psi(x_j^n - x_k^n)}, \quad \text{EQUATION 4}$$

where $f_i$ represents the line integral associated with the data measurement yi. The image updater 208 scales the regularization term β in EQUATION 4 with EQUATION 1 as shown in EQUATION 5:

$$x_j^{n+1} = x_j^n + \frac{M \cdot BP[y_i(f_i - l_i)] + \left(\beta^n \sqrt{BP[y_i]}\right)\sum_k w_k \dot{\psi}(x_j^n - x_k^n)}{BP[y_i a_i] + \left(\beta^n \sqrt{BP[y_i]}\right)\sum_k w_k \ddot{\psi}(x_j^n - x_k^n)}. \quad \text{EQUATION 5}$$

With EQUATIONS 3 and 5, the image updater 208 concurrently updates the entire image each iteration. The image updater 208 can alternatively perform the update voxel by voxel or group of voxels by group of voxels, and/or a subset of the entire image each iteration. Generally, the update algorithm 210 can be based on any iterative reconstruction update algorithms that solve the general cost function $\Psi(x) = -L(Ax|y) + \beta \cdot R(x)$, where the regularization term β is scaled with the scaling factor.

A non-limiting example of an algorithm that instead works at the voxel level is discussed in J-B. Thibault, K. D. Sauer, C. A. Bouman, J. Hsieh, "A three-dimensional statistical approach to improved image quality for multislice helical CT", Med. Phys. 34 (11), November 2007. The algorithm disclosed therein is referred to as iterative coordinate descent or ICD. Another non-limiting example is discussed in J. A. Fessler, "Statistical image reconstruction methods for transmission tomography," Handbook of Medical Imaging, Volume 2: Medical Image Processing and Analysis, pages 1.70, SPIE, Bellingham, 2000.

Likewise, the image updater 208 would scale the regularization term in these algorithms with the scaling factor generated by the scaling factor generator 202.

FIG. 3 illustrates an example method in accordance with the embodiments described herein.

It is to be appreciated that the ordering of the acts in the methods described herein is not limiting. As such, other orderings are contemplated herein. In addition, one or more acts may be omitted and/or one or more additional acts may be included.

At 302, an iterative reconstruction update algorithm employing regularization is obtained. Non-limiting examples of such algorithms are discussed in connection with the equations above.

At 304, projection data from a scan is obtained.

At 306, an initial image is obtained. As discussed herein, the initial image can be all zeros, an filtered-backprojected image, a de-noised image, and/or other image.

At 308, a regularization term is obtained. As discussed herein, the regularization term can be a default term, a user specified term, etc.

At 310, a regularization term scaling factor is generated based on the obtained projection data. As described herein, the regularization term scaling factor is based on the backprojection of the number of photons (or noise) of the projection data, and one non-limiting example includes computing a square root of a backprojection of the projection data.

At 312, the regularization term scaling factor is incorporated into the update algorithm.

At 314, an image is reconstructed based at least on the obtained iterative reconstruction update algorithm, the obtained projection data, the obtained initial image, the obtained regularization term, and the generated regularization term scaling factor.

The above may be implemented by way of computer readable instructions, encoded or embedded on computer readable storage medium, which, when executed by a computer processor(s), cause the processor(s) to carry out the described acts. Additionally or alternatively, at least one of the computer readable instructions is carried by a signal, carrier wave or other transitory medium.

As described herein, the scaling varies the regularization such that in regions of the image where a total or average number of detected photons is higher the regularization strength is stronger and in regions of the image where the number of detected photons is lower the regularization strength is less strong.

As such, the scaling in the regions of the image where the total or average number of detected photons is higher counteracts a stronger update value of the update algorithm, and the scaling in the regions of the image where the total or average number of detected photons is lower counteracts a less strong update value of the update algorithm.

This allows for reconstructing images with consistent image quality independent of patient size, anatomy size, and/or tube current.

The invention has been described with reference to the preferred embodiments. Modifications and alterations may occur to others upon reading and understanding the preceding detailed description. It is intended that the invention be constructed as including all such modifications and alterations insofar as they come within the scope of the appended claims or the equivalents thereof.

The invention claimed is:

1. A method, comprising:
computing a scaling value as a function of the projection data that is received from a CT scanner;
scaling a regularization term of an update algorithm of an iterative reconstruction algorithm with regularization with the scaling value, wherein the scaling value is variable in at least one dimension, thereby varying the regularization of the iterative reconstruction in the least one dimension;
iteratively reconstructing an image based at least on the update algorithm, the varying scaled regularization term, and the projection data;
wherein the computing, the scaling and the iteratively reconstructing are performed using one or more configured processors.

2. The method of claim 1, further comprising:
computing the scaling value by computing a square root of a backprojection of the projection data.

3. The method of claim 1, wherein a noise in the projection data is proportional to an intensity of the projection data.

4. The method of claim 1, wherein the update algorithm includes a constant regularization term, and further comprising multiplying the constant regularization term by scaling value each update.

5. The method of claim 1, wherein the scaling value varies the regularization such that in regions of the image where a total or average number of detected photons is higher the regularization strength is stronger and in regions of the image where the number of detected photons is lower the regularization strength is less strong.

6. The method of claim 5, wherein the scaling of the regularization in the regions of the image where the total or average number of detected photons is higher counteracts a stronger update value of the update algorithm.

7. The method of claim 5, wherein the scaling of the regularization in the regions of the image where the total or average number of detected photons is lower counteracts a less strong update value of the update algorithm.

8. The method of claim 1, wherein the scaling varies the regularization in at least two dimensions.

9. The method of claim 1, wherein the scaling varies the regularization in at least three dimensions.

10. A reconstructor, comprising:
a scaling factor algorithm bank with at least one scaling factor algorithm;
a scaling factor generator that includes one or more processors that generate a regularization term scaling factor based on the at least one scaling factor algorithm, which generates the regularization term sealing factors as a function of the projection data received from a CT scanner;
an update algorithm bank with at least one iterative reconstruction update algorithm employing a regularization term; and
an image updater that includes the one or more processors configured to processes projection data of a scan and reconstruct an image based on the at least one iterative reconstruction algorithm and the regularization term scaling factor, wherein the scaling factor varies the regularization term in of the iterative reconstruction algorithm in at least one dimension.

11. The reconstructor of claim 10, wherein the image updater multiplies the regularization term by the scaling factor when processing the projection data.

12. The reconstructor of claim 10, wherein the scaling factor generator generates the regularization term scaling factor as a square root of a backprojection of the projection data.

13. The reconstructor of claim 10, wherein a noise of the projection data is proportional to an intensity of the projection data.

14. The reconstructor of claim 10, wherein the scaling factor varies the regularization such that in regions of the image where a total or average number of detected photons is higher the regularization strength is stronger and in regions of the image where the number of detected photons is lower the regularization strength is less strong.

15. The reconstructor of claim 14, wherein the scaling of regularization in the regions of the image where the total or average number of detected photons is higher counteracts a stronger update value of the update algorithm and the scaling of regularization in the regions of the image where the total or average number of detected photons is lower counteracts a less strong update value of the update algorithm.

16. The reconstructor of claim 10, further comprising:
a console that visually presents a plurality of scaling factor algorithms and receives a signal indicative of a user selected one of the plurality of scaling factor algorithms, wherein the scaling factor generator generates the regularization term scaling factor based on the user selected one of the plurality of scaling factor algorithms.

17. A non-transitory computer readable storage medium encoded with computer readable instructions, which, when executed by a processer, causes the processor to:
compute a scaling value as a function of projection data received from a CT scanner; and
reconstruct the projection data thereby generating an image using an iterative reconstruction algorithm with regularization in which a regularization term of an update algorithm of the iterative reconstruction algorithm varies in at least one dimension based on a number of detected photons in the projection data according to the computed scaling value.

18. The computer readable storage medium of claim 17, wherein the processor, when executing the computer readable instructions, further causes the processor to:
compute a square root of a backprojection of the projection data; and
employ the computed value to scale and vary the regularization term in the at least one dimension.

19. A method, comprising:
scaling a regularization term of an update algorithm of an iterative reconstruction algorithm with regularization such that scaling of the regularization in regions of the image where a total or average number of detected photons is higher counteracts a stronger update value of the update algorithm, wherein the scaling is according to a value computed using one or more configured processors as a function of the projection data received from a CT scanner.

* * * * *